United States Patent [19]
Shimizu

[11] Patent Number: 5,337,341
[45] Date of Patent: Aug. 9, 1994

[54] X-RAY RADIOGRAPHIC APPARATUS

[75] Inventor: Yasumitsu Shimizu, Takatsuki, Japan

[73] Assignee: Shimadzu Corporation, Kyoto, Japan

[21] Appl. No.: 11,253

[22] Filed: Jan. 29, 1993

[30] Foreign Application Priority Data

Jan. 31, 1992 [JP] Japan .................................. 4-046192

[51] Int. Cl.⁵ .............................................. H05G 1/64
[52] U.S. Cl. ...................................... 378/98.2; 378/62
[58] Field of Search .................. 378/99, 98, 62, 114, 378/115, 116; 358/111, ; 250/370.09

[56] References Cited

U.S. PATENT DOCUMENTS

| 4,245,158 | 1/1981 | Burstein et al. ...................... 250/370 |
| 4,963,955 | 10/1990 | Hatanaka et al. ...................... 357/30 |
| 5,233,411 | 8/1993 | Nam et al. .............................. 358/75 |

FOREIGN PATENT DOCUMENTS

| 0386587 | 9/1290 | European Pat. Off. . |
| 0247758 | 12/1987 | European Pat. Off. . |
| 0287129 | 10/1988 | European Pat. Off. . |
| 52-153328 | 12/1977 | Japan . |
| 59-80082 | 5/1984 | Japan . |

Primary Examiner—David P. Porta
Attorney, Agent, or Firm—Nikaido, Marmelstein, Murray & Oram

[57] ABSTRACT

An X-ray radiographic apparatus has an electronic shutter circuit operable at a photographing time to vary time for storing electric charges in a CCD image pickup device. This avoids saturation of the CCD image pickup device due to an increased quantity of X-rays. Further, an image outputted from the CCD image pickup device is latched at the photographing time for improved durability and responsibility. A photographed image may be observed on a monitor unit also after photo taking.

1 Claim, 3 Drawing Sheets

X-RAY RADIOGRAPHIC APPARATUS

BACKGROUND OF THE INVENTION (1) Field of the Invention

This invention relates to an X-ray radiographic apparatus for facilitating gastrointestinal examination in human medical care. The apparatus includes a diagnostic table, an X-ray emitter for emitting X-rays to the diagnostic table, an X-ray high voltage unit for generating varied currents to switch a quantity of X-rays emitted from the X-ray emitter between a monitoring condition and a photographing condition, a filming mechanism mounted in the diagnostic table for photographing X-ray images based on the X-rays emitted from the X-ray emitter, an image intensifier attached to the diagnostic table for converting the X-ray images to visible light images, a CCD (charge coupled device) camera unit for converting the visible light images to image signals, and a monitor unit for receiving the image signals from the CCD camera unit to display the visible light images converted by the image intensifier.

(2) Description of the Prior Art

The X-ray radiographic apparatus allows observation on a monitor unit, and film photography carried out with selected timing. Normally, a doctor or other person observes X-ray penetration images on the monitor unit. When a desired image appears on the monitor unit, the doctor or other person gives a photographing command to take this image on photographic film. At the time of this photo taking, the film is transported to a front surface of an image intensifier, and the quantity of X-rays is increased to expose the film. The X-rays having penetrated the film enters the image intensifier. If the X-rays in the increased quantity were not modified, the CCD image pickup device of the CCD camera unit connected to the image intensifier would be saturated. Conventionally, an optical diaphragm is interposed between the image intensifier and CCD camera unit to reduce light at photographing times. In this way, images may also be observed on the monitor unit while the images are photographed, without saturating the CCD image pickup device.

However, the optical diaphragm used heretofore for reducing light is a mechanical device which has the disadvantages of poor responsibility and durability due to mechanical motion.

Further, with the conventional X-ray radiographic apparatus, the image appearing on the monitor unit during photo taking is based on X-rays intended for film photography. The image is eliminated from the monitor unit immediately upon completion of film photography. Thus, the conventional apparatus also has the disadvantage that an image actually photographed cannot be confirmed on the monitor unit following the photo taking.

SUMMARY OF THE INVENTION

Having regard to the state of the art noted above, a primary object of this invention is to provide an X-ray radiographic apparatus which allows a photographed image to be observed on the monitor unit during photo taking, without saturating the CCD image pickup device, and which has improved durability and responsibility.

A further object of this invention is to provide an X-ray radiographic apparatus which allows a photographed image to be observed on the monitor unit immediately after photo taking also.

The primary object above is fulfilled, according to this invention, by an X-ray radiographic apparatus comprising a diagnostic table, an X-ray emitter for emitting X-rays to the diagnostic table, an X-ray high voltage unit for generating varied currents to switch a quantity of X-rays emitted from the X-ray emitter between a monitoring condition and a photographing condition, a filming mechanism mounted in the diagnostic table for photographing X-ray images based on the X-rays emitted from the X-ray emitter, an image intensifier attached to the diagnostic table for converting the X-ray images to visible light images, a CCD camera unit for converting the visible light images to image signals, and a monitor unit for receiving the image signals from the CCD camera unit to display the visible light images converted by the image intensifier, wherein the CCD camera unit includes an electronic shutter circuit for varying time for storing electric charges in a CCD image pickup device, the apparatus further comprising a controller for actuating the electronic shutter circuit to reduce the time for storing electric charges in the CCD image pickup device when the X-ray high voltage unit switches the quantity of X-rays emitted from the X-ray emitter to the photographing condition.

According to this X-ray radiographic apparatus, when the quantity of X-rays emitted from the X-ray emitter is increased for photographing an image on film, the controller controls the electronic shutter circuit to diminish the electric charges stored in the CCD image pickup device.

Thus, an image photographed may be confirmed on the monitor unit reliably by means of the X-rays having passed through the film, without saturating the CCD image pickup device despite the increased quantity of X-rays for filming the image. Saturation is avoided by operating the electronic shutter circuit to diminish the electric charges stored in the CCD image pickup device. Since this invention does not employ a mechanical device to diminish the electric charges, durability and responsibility are improved to be free from functional wear and the like.

The further object is fulfilled, according to this invention, by an X-ray radiographic apparatus further comprising a memory section for latching the image signal received from the CCD camera unit when in the photographing condition, and an image holding device for causing the image signal latched by the memory section to be outputted to the monitor unit when the X-ray high voltage unit switches the quantity of X-rays emitted from the X-ray emitter to the monitoring condition and before the quantity of X-rays is diminished for the monitoring condition.

According to this X-ray radiographic apparatus, when switching is made, after photographing an image on film, to the monitoring condition in preparation for photographing a next location, the image holding device causes the photographed image, and not an image for monitoring, to be displayed continuously on the monitor unit until the quantity of X-rays emitted is diminished for the monitoring condition.

Consequently, the image actually photographed on film may be observed immediately after a photographing operation. This allows reconfirmation of the location photographed and confirmation of image quality to realize reliable photo taking.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DETAILED DESCRIPTION OF THE PREFERRED EMBODIMENT

An embodiment of this invention will be described in detail hereinafter with reference to the drawings.

Figure 1:
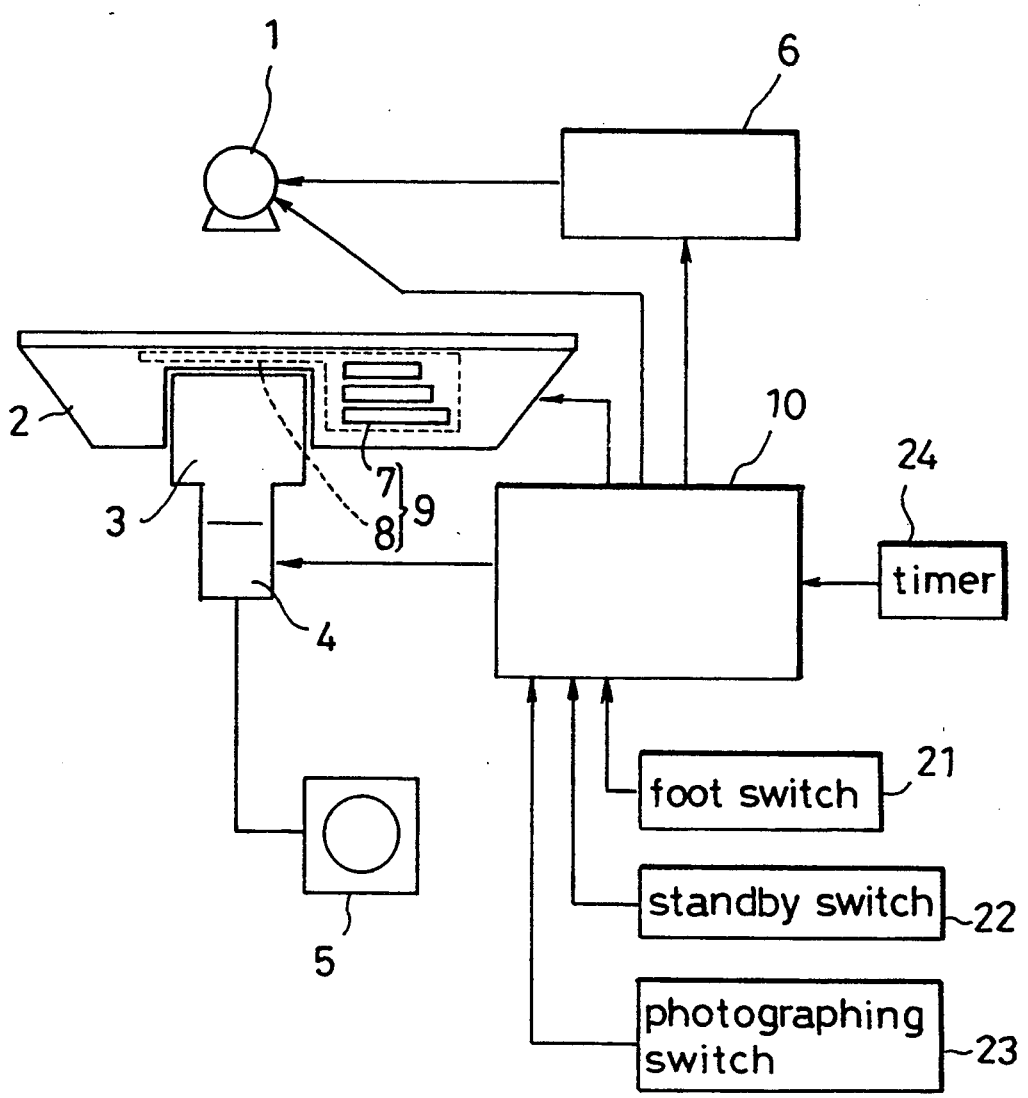
FIG. 1 is a schematic side view of an X-ray radiographic apparatus embodying this invention.

FIG. 1 is a schematic side view of an X-ray radiographic apparatus embodying this invention. The apparatus includes an X-ray emitter 1 for emitting X-rays toward an X-ray diagnostic table 2. An examinee, not shown, is placed on the diagnostic table 2. An image intensifier 3 is attached to the diagnostic table 2 for receiving the X-rays having passed through the examinee and converting X-ray images to visible light images.

A CCD camera unit 4 is connected to the image intensifier 3, and a monitor unit 5 is connected to the CCD camera unit 4. The visible light images emerging from the image intensifier 3 are converted to video signals by the CCD camera unit 4. The monitor unit 5 displays X-ray images of the examinee corresponding to the video signals.

An X-ray high voltage unit 6 is connected to the X-ray emitter 1 for generating varied currents to switch quantity of the X-rays emitted between a monitoring condition and a photographing condition. In the monitoring condition, the high voltage unit 6 supplies a low current to the X-ray emitter 1 whereby the X-ray emits X-rays in a small quantity to show X-ray images of the examinee on the monitor unit 5. In the photographing condition, the high voltage unit 6 supplies a high current to the X-ray emitter 1 whereby the X-ray emits X-rays in a large quantity to allow X-ray images of the examinee to be photographed on film.

The diagnostic table 2 has a filming mechanism 9 mounted therein. The filming mechanism 9 includes a cassette holder 7, and a film transport mechanism 8 for transporting film from the cassette holder 7 to a photographing position, and transporting photographed film back to the cassette holder 7.

A controller 10 is connected to the X-ray emitter 1, diagnostic table 2, CCD camera unit 4, X-ray high voltage unit 6 and filming mechanism 9 to control operations thereof, respectively.

Upon receipt of a filming command from the controller 10, the film in the diagnostic table 2 is transported to a front surface of the image intensifier 3 to be exposed by the X-rays. The X-ray emitter 1 is connected to the diagnostic table 2 through an arm or the like, not shown. Thus, the X-ray emitter 1 makes a rotating motion, for example, in unison with the diagnostic table 2 under control of the controller 10.

Figure 2:
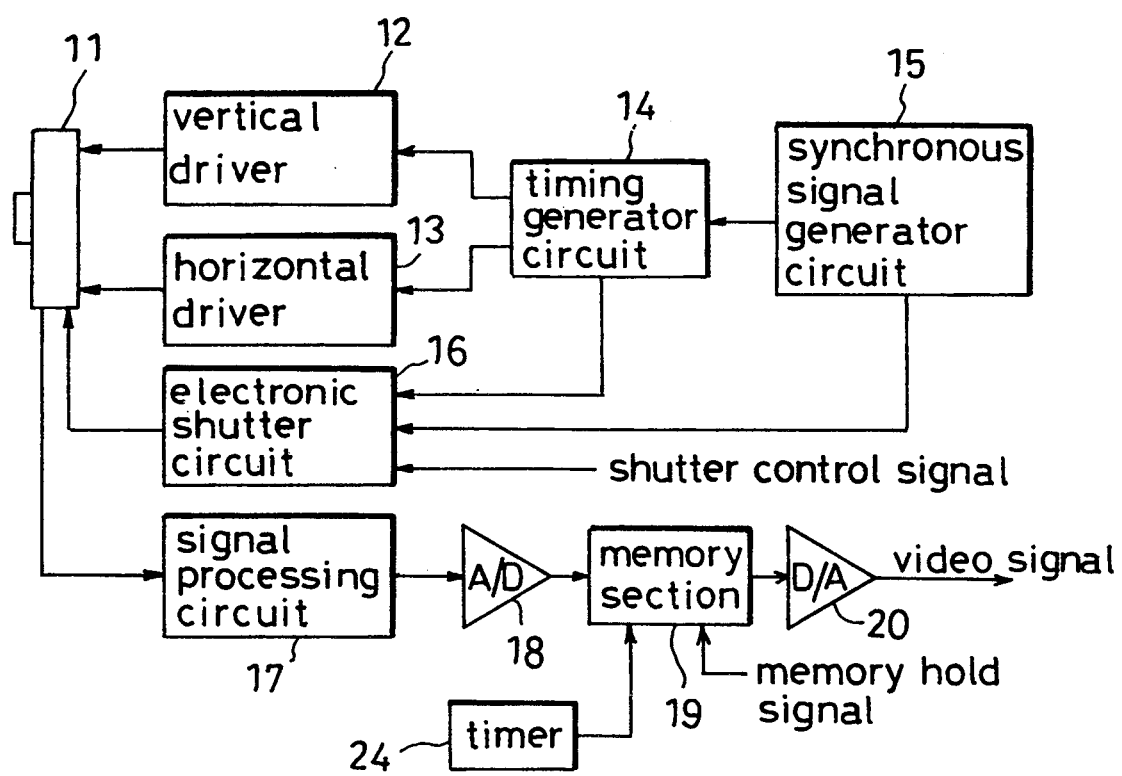
FIG. 2 is a block diagram showing a signal system in a CCD camera unit of the X-ray radiographic apparatus.

As shown in the block diagram of FIG. 2, the CCD camera unit 4 includes a CCD image pickup device 11, a vertical driver 12 for vertically scanning pixels of the image pickup device 11, a horizontal driver 13 for horizontally scanning the pixels, a timing generator circuit 14, a synchronous signal generator circuit 15, an electronic shutter circuit 16, a signal processing circuit 17 for processing an output signal from the CCD image pickup device 11 and converting the output signal to a video signal, an analog-to-digital convertor 18 for converting the video signal to a digital signal, a memory section 19 for latching the digital signal in response to a memory hold signal described later, and a digital-to-analog converter 20 for converting the digital signal read from the memory section 19 to an analog video signal.

The electronic shutter circuit 16 is operable in response to a shutter control signal transmitted from the controller 10 to follow the switching between the monitoring condition and photographing condition. Consequently, time for storing electric charges in the CCD camera unit 4 is variable; a long charge storing time for the monitoring condition and a short charge storing time for the photographing condition.

Operation of the memory section 19 is controlled by the memory hold signal transmitted from the controller 10. The images latched by the memory section 19 normally are renewed frame by frame in real time. When the memory hold signal is turned on, the image in the frame latched then is held without being renewed. Thus, while the memory hold signal is off, the memory section 19 successively outputs images in the order in which the images are inputted thereto. After the memory hold signal is turned on, the memory section 19 continues outputting the same latched image frame after frame.

As shown in FIG. 1, the controller 10 has, connected thereto, a foot switch 21 for causing the X-ray emitter 1 to emit X-rays, a standby switch 22 for causing the X-ray high voltage unit 6 to supply the high current to the X-ray emitter 1 to switch from the monitoring condition to the photographing condition, a photographing switch 23 for causing the X-ray emitter 1, in the photographing condition, to emit X-rays in an increased quantity, and a timer 24 for setting time at which the memory section 19 stops output of the image signal latched, i.e. time for turning off the memory hold signal.

Figure 3:
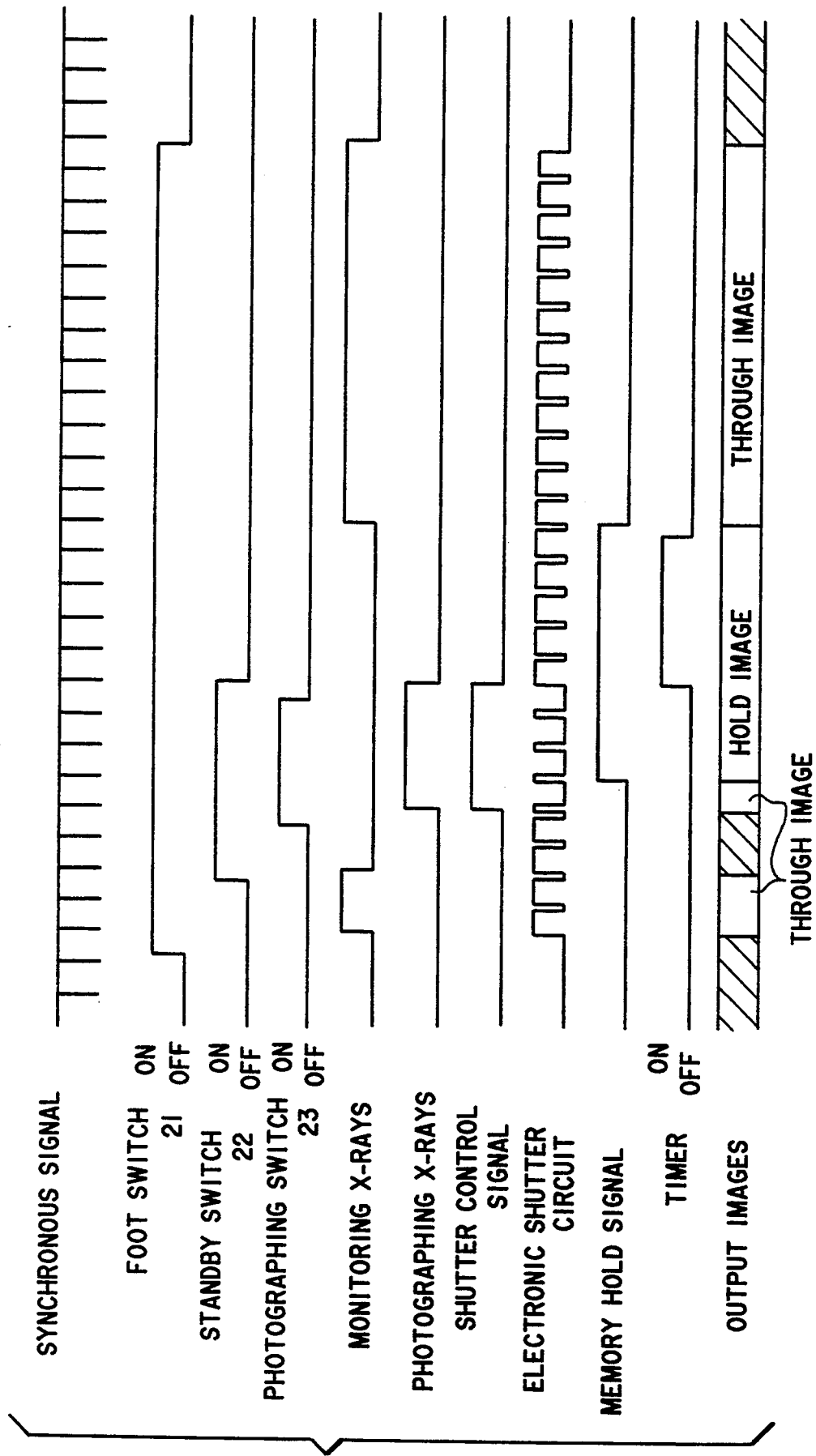
FIG. 3 is a time chart illustrating operation of the X-ray radiographic apparatus.

Operation of the controller 10 will be described next with reference to the time chart of FIG. 3.

When the foot switch 21 is turned on, the X-rays are emitted in a small quantity optimal for monitoring purposes (i.e. monitoring X-rays). At this time, the shutter circuit 16 remains inoperative to allow the CCD image pickup device 11 to store all charges based on the monitoring X-rays. The resulting X-ray images (through images) are displayed on the monitor unit 5.

Next, the doctor or other person operates the standby switch 22 after confirming a location in the examinee's body to be photographed by referring to the through images. As a result, the X-ray emitter 1 stops the X-ray emission in response to a synchronous signal transmitted immediately after the standby switch operation. An increased current is supplied to a filament of the X-ray emitter 1 to switch to a condition for generating a large quantity of thermions. At the same time, the filming mechanism 9 is actuated to transport the film from the cassette holder 7 to the photographing position.

Subsequently, the photographing switch 23 is turned on to cause the X-ray high voltage unit 6 to supply the high current, whereby the X-ray emitter 1 operates in response to a vertical synchronous signal transmitted immediately thereafter to switch from the monitoring condition to the photographing condition. The X-rays are now emitted in the increased quantity for the photographing condition (i.e. photographing X-rays), and the shutter control signal is outputted to cause the electronic shutter circuit 16 to output a pulse signal of small pulsewidth (e.g. 1/10000 second) in response to the synchronous signal. Only with rises of the pulse signal, the charges based on the X-rays having penetrated the film are stored in the CCD image pickup device 11. The resulting X-ray images (i.e. through images) are displayed on the monitor unit 5. At the same time, the memory hold signal is inputted to the memory section 19 in response to a next synchronous signal. The memory section 19 continues outputting an image signal corresponding to the X-ray image for filming. This hold image is displayed on the monitor unit 5. The X-ray emission is suspended after the standby switch 22 is turned on and before the photographing X-rays are emitted. During this period, therefore, no display is made on the monitor unit 5 (such periods being hatched in FIG. 3). Nothing appears on the monitor unit 5 while the foot switch 21 is off, either.

Next, the photographing switch 23 is turned off, and the standby switch 22 is turned off in response to an immediately succeeding synchronous signal. As a result, emission of the photographing X-rays is stopped, and the shutter control signal is stopped also. The timer 24 is turn on to set a period of time for inputting the memory hold signal to the memory section 19.

The timer 24 is turned off upon lapse of the set period of time, and input of the memory hold signal is stopped in response to an immediately succeeding synchronous signal. Consequently, the through X-ray images are displayed on the monitor unit 5.

In this way, the hold image is displayed while the memory hold signal is inputted to the memory section 19 after the photo taking. This allows observation of the photographed image immediately following the photo taking.

When the foot switch 21 is turned off subsequently, emission of X-rays is stopped.

For successively taking photographs while looking at through images on the monitor unit 5, the foot switch 21 is maintained in ON state, and the standby switch 22 and photographing switch 23 are turned on and off as above.

The pulse signal outputted from the electronic shutter circuit 16 has variable pulsewidths. The pulsewidth may be somewhat enlarged when photographing, for example, a bony location which tends to diminish the quantity of X-rays passing therethrough to the CCD image pickup device 11. Thus, clear through images may be displayed on the monitor unit 5 regardless of the conditions of locations to be photographed.

This invention includes a construction as described above, which may be called image holding means, for causing the memory hold signal to be inputted to the memory section 19 in response to a second synchronous signal after the photographing switch 23 is turned on, causing the timer 24 to maintain input of the memory hold signal for a predetermined period of time, and causing the image signal latched by the memory section 19 to be outputted to the monitor unit 5 when the X-ray high voltage unit 6 switches the quantity of X-rays emitted from the X-ray emitter 1 to the monitoring condition and before the quantity of X-rays is diminished for the monitoring condition.

The present invention may be embodied in other specific forms without departing from the spirit or essential attributes thereof and, accordingly, reference should be made to the appended claims, rather than to the foregoing specification, as indicating the scope of the invention.

What is claimed is:

1. An X-ray radiographic apparatus comprising:
   a diagnostic table;
   an X-ray emitter for emitting X-rays to said diagnostic table;
   an X-ray high voltage unit for generating varied currents to switch a quantity of X-rays emitted from said X-ray emitter between a monitoring condition and a photographing condition;
   a filming mechanism mounted in said diagnostic table for photographing X-ray images based on the X-rays emitted from said X-ray emitter;
   an image intensifier attached to said diagnostic table for converting said X-ray images to visible light images;
   a CCD camera unit for converting said visible light images to image signals, said CCD camera unit including an electronic shutter circuit for varying time for storing electric charges in a CCD image pickup device;
   a monitor unit for receiving said image signals from said CCD camera unit to display said visible light images converted by said image intensifier;
   control means for actuating said electronic shutter circuit to reduce the time for storing electric charges in said CCD image pickup device when said X-ray high voltage unit switches the quantity of X-rays emitted form said X-ray emitter to said photographic condition;
   memory means for latching the image signal received from said CCD camera unit when in said photographing condition; and
   image holding means for causing the image signal latched by said memory means to be outputted to said monitor unit when said X-ray high voltage unit switches the quantity of X-rays emitted from said X-ray emitter to said monitoring condition and before the quantity of X-rays is diminished for said monitoring condition.

* * * * *